United States Patent
Kim et al.

(10) Patent No.: US 11,415,857 B2
(45) Date of Patent: Aug. 16, 2022

(54) ELECTROCHROMIC FILM

(71) Applicant: LG CHEM, LTD., Seoul (KR)

(72) Inventors: Yong Chan Kim, Daejeon (KR); Song Ho Jang, Daejeon (KR); Ki Hwan Kim, Daejeon (KR); Pil Sung Jo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 340 days.

(21) Appl. No.: 16/604,373

(22) PCT Filed: Apr. 23, 2018

(86) PCT No.: PCT/KR2018/004668
§ 371 (c)(1),
(2) Date: Oct. 10, 2019

(87) PCT Pub. No.: WO2018/199568
PCT Pub. Date: Nov. 1, 2018

(65) Prior Publication Data
US 2021/0181592 A1 Jun. 17, 2021

(30) Foreign Application Priority Data

Apr. 27, 2017 (KR) .................. 10-2017-0054317
Apr. 19, 2018 (KR) .................. 10-2018-0045420

(51) Int. Cl.
*G02F 1/15* (2019.01)
*G02F 1/155* (2006.01)

(52) U.S. Cl.
CPC .......... *G02F 1/155* (2013.01); *G02F 2203/02* (2013.01)

(58) Field of Classification Search
CPC .. B32B 7/02; G02B 5/00; G02B 5/003; G02F 1/155; G02F 1/135; G02F 2203/02
USPC .................................................. 359/245–279
See application file for complete search history.

(56) References Cited

U.S. PATENT DOCUMENTS

| 7,796,320 | B2* | 9/2010 | Yang ..................... H01L 51/102 359/245 |
| 2004/0191618 | A1 | 9/2004 | Morin et al. |
| 2011/0013254 | A1 | 1/2011 | Widjaja et al. |
| 2013/0140065 | A1 | 6/2013 | Koo et al. |
| 2014/0002883 | A1 | 1/2014 | Jun et al. |
| 2014/0085700 | A1 | 3/2014 | Park |

(Continued)

FOREIGN PATENT DOCUMENTS

| JP | 55-149776 U | 4/1980 |
| JP | 58-21120 U | 8/1983 |

(Continued)

OTHER PUBLICATIONS

International Search Report (PCT/ISA/210) issued in PCT/KR2018/004668, dated Jul. 31, 2018.

(Continued)

*Primary Examiner* — Mahidere S Sahle
(74) *Attorney, Agent, or Firm* — Birch, Stewart, Kolasch & Birch, LLP (57) ABSTRACT

An electrochromic film, which is a reflective electrochromic film, which includes an electrode layer, a light absorbing layer and an electrochromic layer. The film can improve an electrochromism rate and realize various colors or esthetic senses.

18 Claims, 4 Drawing Sheets

(56) References Cited

U.S. PATENT DOCUMENTS

| | | | |
|---|---|---|---|
| 2014/0198371 A1* | 7/2014 | Conklin | G02F 1/157 359/275 |
| 2016/0147125 A1 | 5/2016 | Theodore | |
| 2016/0282695 A1 | 9/2016 | Agrawal et al. | |
| 2016/0370680 A1* | 12/2016 | Geerlings | G02F 1/155 |
| 2018/0224960 A1 | 8/2018 | Park et al. | |
| 2019/0159339 A1 | 5/2019 | Lee et al. | |

FOREIGN PATENT DOCUMENTS

| | | |
|---|---|---|
| JP | 62-154432 U | 9/1987 |
| JP | 6-82840 A | 3/1994 |
| JP | 2005-70590 A | 3/2005 |
| JP | 2014-513335 A | 5/2014 |
| KR | 10-2006-0092362 A | 8/2006 |
| KR | 10-2008-0040439 A | 5/2008 |
| KR | 10-2009-0034948 A | 4/2009 |
| KR | 10-2014-0001502 A | 1/2014 |
| KR | 10-2014-0041117 A | 4/2014 |
| KR | 10-2015-0090460 A | 8/2015 |
| KR | 10-2016-0035998 A | 4/2016 |
| KR | 10-2016-0072586 A | 6/2016 |
| KR | 10-2016-0142703 A | 12/2016 |

OTHER PUBLICATIONS

European Search Report for Appl. No. 18790622.7 dated Jan. 24, 2020.
European Office Action dated Jul. 15, 2021 for Application No. 18790622.7.

* cited by examiner

ELECTROCHROMIC FILM

CROSS-REFERENCE TO RELATED APPLICATIONS

This application claims the benefit of priority based on Korean Patent Application No. 10-2017-0054317 filed on Apr. 27, 2017 and Korean Patent Application No. 10-2018-0045420 filed on Apr. 19, 2018, the disclosures of which are incorporated herein by reference in their entirety.

TECHNICAL FIELD

The present application relates to an electrochromic film.

BACKGROUND ART

Electrochromism refers to a phenomenon in which an optical property of an electrochromic material is changed by an electrochemical oxidation or reduction reaction, where the device using the phenomenon is referred to as an electrochromic device. The electrochromic device generally comprises a working electrode, a counter electrode and an electrolyte, where optical properties of each electrode can be reversibly changed by an electrochemical reaction. For example, the working electrode or the counter electrode may comprise a transparent conductive material and an electrochromic material in the form of films, respectively, and in the case where a potential is applied to the device, as the electrolyte ions are inserted into or removed from the electrochromic material-containing film and the electrons simultaneously move through an external circuit, the optical property changes of the electrochromic material appear.

Such an electrochromic device is advantageous in that it is capable of producing a large area device with a small cost and has low power consumption. However, since it has a slow color-switching speed, there is a need for improvement. On the other hand, conventional electrochromic devices do not partly meet market demands for various colors or superior esthetic senses because the colors implemented by the devices have been solely dependent on the electrochromic materials.

DISCLOSURE

Technical Problem

It is one object of the present application to provide an electrochromic film having an improved color-switching speed (or electrochromic switching speed).

It is another object of the present application to provide an electrochromic film capable of implementing various color senses or stereoscopic color patterns.

The above and other objects of the present application can be all solved by the present application which is described in detail below.

Technical Solution

In one example of the present application, the present application relates to an electrochromic film. The electrochromic film comprises a reflective base material and an electrochromic layer. The electrochromic film of the present application is a so-called "reflective" electrochromic film, the constitution of which is different from that of a general transmissive electrochromic film comprising a light-transmitting electrode material and a light-transmitting base material on both lateral surfaces of the film. Specifically, according to one embodiment of the present application, a metal material having low light transmission characteristics and remarkably dominant reflection characteristics can be used on at least one side of the film.

The reflective electrochromic film of the present application comprising the reflective base material and the electrochromic layer simultaneously has excellent esthetic senses and color implementation characteristics. For example, in the case of a conventional electrochromic element comprising only a configuration corresponding to the electrochromic layer, the change in optical characteristics of the element generally depends on the inherent color itself expressed by the electrochromic material. However, as described below, since the electrochromic film of the present application comprises a reflective base material having a structure in which a metal electrode layer (light reflecting layer) having a dominant light reflection function and a light absorbing layer having a dominant light absorption function are laminated, various esthetic senses can be provided.

Figure 1:
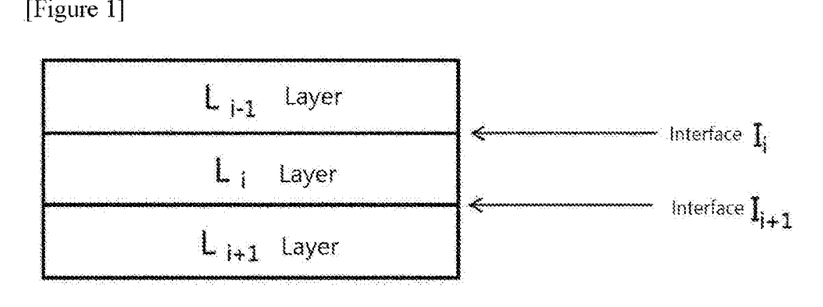
FIG. 1 is a view for explaining a concept of a reflecting layer and an absorbing layer.

In the present application, the light reflecting layer (metal electrode layer) may mean a layer that reflects light of a specific wavelength relatively much, and the light absorbing layer may mean a layer that reflects light of a specific wavelength relatively less. For example, as shown in FIG. 1, assuming that an $L_{i-1}$ layer, an $L_i$ layer and an $L_{i+1}$ layer are laminated in this order on the basis of a direction in which light enters, an interface $I_i$ is located between the $L_{i-1}$ layer and the $L_i$ layer, and an interface $I_{i+1}$ is located between the $L_i$ layer and the $L_{i+1}$ layer, the light reflecting layer and the light absorbing layer will be described as follows.

When the layers have been irradiated with light having a specific wavelength in a direction perpendicular to each layer so that thin film interference does not occur, the reflectance at the interface $I_i$ can be expressed by Equation 1 below.

$$\frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2} \quad \text{[Equation 1]}$$

In Equation 1 above, $n_i(\lambda)$ denotes a refractive index according to the wavelength ($\lambda$) of the i-th layer, $k_i(\lambda)$ denotes an extinction coefficient according to the wavelength ($\lambda$) of the i-th layer. The extinction coefficient is a measure that can define how strongly an object material absorbs light at a specific wavelength, as described below.

When the sum of reflectance for each wavelength at the interface $I_i$ calculated, for example, at each wavelength in a predetermined range of wavelengths, for example, 380 nm to 780 nm, is $R_i$ by applying Equation 1 above, $R_i$ is as expressed by Equation 2 below.

$$R_i = \frac{\sum_{\lambda=380\,nm}^{\lambda=780\,nm} \frac{[n_i(\lambda) - n_{i-1}(\lambda)]^2 + [k_i(\lambda) - k_{i-1}(\lambda)]^2}{[n_i(\lambda) + n_{i-1}(\lambda)]^2 + [k_i(\lambda) + k_{i-1}(\lambda)]^2} \Delta\lambda}{\sum_{\lambda=380\,nm}^{\lambda=780\,nm} \Delta\lambda} \quad \text{[Equation 2]}$$

In summary, when the $R_i$ of the $I_i$ among interfaces of a laminate is the largest, the layer contacting the interface $I_i$ and positioned opposite to a direction, in which light enters, with the interface $I_i$ may be defined as a light reflecting layer and the remaining layer may be defined as a light absorbing layer. For example, in the laminate shown in FIG. 1, when the sum of the reflectance for each wavelength of the interface $I_{i+1}$ is the largest, the layer $L_{i+1}$ contacting the interface $I_{i+1}$ and positioned opposite to a direction, in which light enters, with the interface $I_{i+1}$ may be regarded as a light reflecting layer, the remaining layers $L_{i-1}$ layer and/or $L_i$ layer may be regarded as a light absorbing layer.

In the present application, the light reflection function is made by the metal electrode layer.

Figure 2:
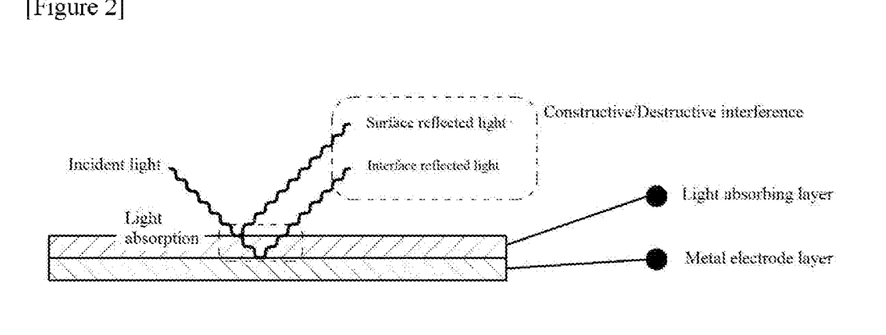
FIG. 2 is a conceptual diagram for explaining a color change principle by a reflective base material according to the present application.

The reflective base material may comprise a metal electrode layer and a light absorbing layer. In this regard, FIG. 2 shows a reflective base material in accordance with one example of the present application. As shown, in the light absorbing layer, the light absorption occurs in both an incident path and a reflex path, and the light reflection occurs at all the surfaces and the interfaces of each layer. The constructive interference and destructive interference occurring between reflected light add additional color changes or esthetic senses to the inherent color of the electrochromic layer. Accordingly, the electrochromic film of the present application may allow a color, a color sense or a color pattern, which is different from the color expressed in the electrochromic layer, to be viewed by the user.

In one example, the metal electrode layer included in the reflective base material may comprise aluminum (Al), gold (Au), silver (Ag), platinum (Pt), palladium (Pd), titanium (Ti), nickel (Ni), tungsten (W), copper (Cu) or an alloy thereof. The reflectiveness of the metal facilitates light interference by the light absorbing layer and allows special colors or color senses of the present application to be clearly visible on the user side.

In one example, the metal electrode layer may comprise no oxide, nitride or oxynitride of the above-listed metal components. That is, the electrode layer may be a layer comprising only a metal component. Since such an oxide, nitride or oxynitride may have a high light transmission characteristic or a high light absorption characteristic, the reflection effect by the electrode layer required in the reflective electrochromic film of the present application may not be sufficiently realized.

On the other hand, in the electrochromic films according to the prior art, it has been common to use a light-transmitting material as the electrode material located on both sides of the film. In particular, a transparent conductive oxide typified by ITO has been widely used as the light-transmitting material. However, since such a transparent conductive oxide has high sheet resistance, it does not contribute to the improvement of the color-switching speed. However, since the metal materials listed above have low sheet resistance as compared to ITO, the electrochromic time of the film can be shortened.

Without being particularly limited, the metal electrode layer may have a thickness in a range of 5 nm to 500 nm, for instance, 10 nm to 500 nm. In the present application, the "thickness" may mean, when a virtual normal line is drawn from the ground toward the film, "a normal distance between any point on the layer that meets the normal line and the opposite surface point of the relevant layer" or "the average normal distance between one side of the measuring object layer and the other side facing it."

The light absorbing layer included in the reflective base material may be a layer that alters, adjusts or changes the color or color sense shown by the colored or bleached electrochromic layer by interaction with the metal electrode layer. This alteration, adjustment or change is provided by optical interference by the electrode layer and the light absorbing layer.

The light absorbing layer may comprise a metal oxide, a metal nitride, or a metal oxynitride.

In one example, the light absorbing layer may comprise an oxide, a nitride or an oxynitride, which contains one or more metals from nickel (Ni), chrome (Cr), iron (Fe), cobalt (Co), titanium (Ti), vanadium (V), aluminum (Al), gold (Au), copper (Cu), silver (Ag), molybdenum (Mo) and an alloy thereof. More specifically, the light absorbing layer may comprise a nitride or an oxynitride comprising one or more selected from molybdenum (Mo), titanium (Ti), aluminum (Al) and copper (Cu).

In one example, the light absorbing layer may comprise $CuO_xN_y$ ($0 \leq x \leq 1$, $0 \leq y \leq 1$, $x+y>0$). At this time, x and y may mean ratios of atomic numbers of oxygen (O) and nitrogen (N) to one atom of copper (Cu), respectively.

In another example, the light absorbing layer may comprise a nitride or an oxynitride containing both molybdenum and titanium. More specifically, the light absorbing layer may comprise $MoTi_aO_xN_y$ ($0<a \leq 2$, $0 \leq x \leq 3$, $0 \leq y \leq 2$, $x+y>0$). At this time, a, x and y mean ratios of atomic numbers of titanium (Ti), oxygen (O) and nitrogen (N) to one atom of molybdenum (Mo), respectively.

In another example, the light absorbing layer may comprise a nitride or an oxynitride of aluminum (Al). More specifically, the light absorbing layer may comprise $AlO_xN_y$ ($0 \leq x \leq 1.5$, $0 \leq y \leq 1$, $x+y>0$) satisfying the following relation equation.

$$1 < \frac{(\text{aluminum elemental content}) \times 3}{(\text{oxygen elemental content}) \times 2 + (\text{nitrogen elemental content}) \times 3} < 2 \quad \text{[Relation Equation]}$$

However, in $AlO_xN_y$, x and y mean ratios of atomic numbers of O and N to one atom of Al, respectively and in Relation Equation above, based on 100% of all elemental contents contained in $AlO_xN_y$, the (aluminum elemental content) represents the elemental content (atomic %) of Al, the (oxygen elemental content) represents the elemental content (atomic %) of O, and the (nitrogen elemental content) represents the elemental content (atomic %) of N.

The above relation equation is an equation considering the elemental content (atomic %) and the chemical valence measured by XPS (X-ray photoelectron spectroscopy). The chemical valence of Al is 3, the chemical valence of O is 2, and the chemical valence of N is 3. When the value of the above relation equation is larger than 1, it means that Al is rich among Al, O and N; and when the value is 1 or less, it means that Al is lack among Al, O and N. For example, $Al_2O_3$ or AlN stoichiometrically represents a relatively transparent phase, and the value of the relation equation is 1. In such a case, it is difficult to perform the above-mentioned function of the light absorbing layer. On the other hand, if the value obtained in the above relation equation is larger than 2, the content of Al becomes higher and the metal property becomes strong, so that the reflectiveness becomes high and it is difficult to perform the above-mentioned function of the light absorbing layer.

The light absorbing layer may have a thickness in a range of 5 nm to 500 nm. The shape of the light absorbing layer is not particularly limited as long as it has a thickness in the above range.

Figure 3:
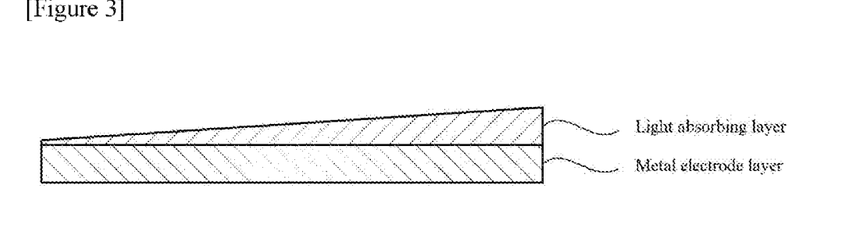
FIG. 3 shows a cross-section of a reflective base material according to one example of the present application.

In one example, the light absorbing layer may have a thickness gradient as in FIG. 3. In this case, the light absorbing layer may be a gradient layer whose cross-section has a gradient, where the cross-section may have a shape of a triangle, or a quadrilateral such as a trapezoid. The gradient that can be identified through the cross-section can be two or more.

Figure 4:
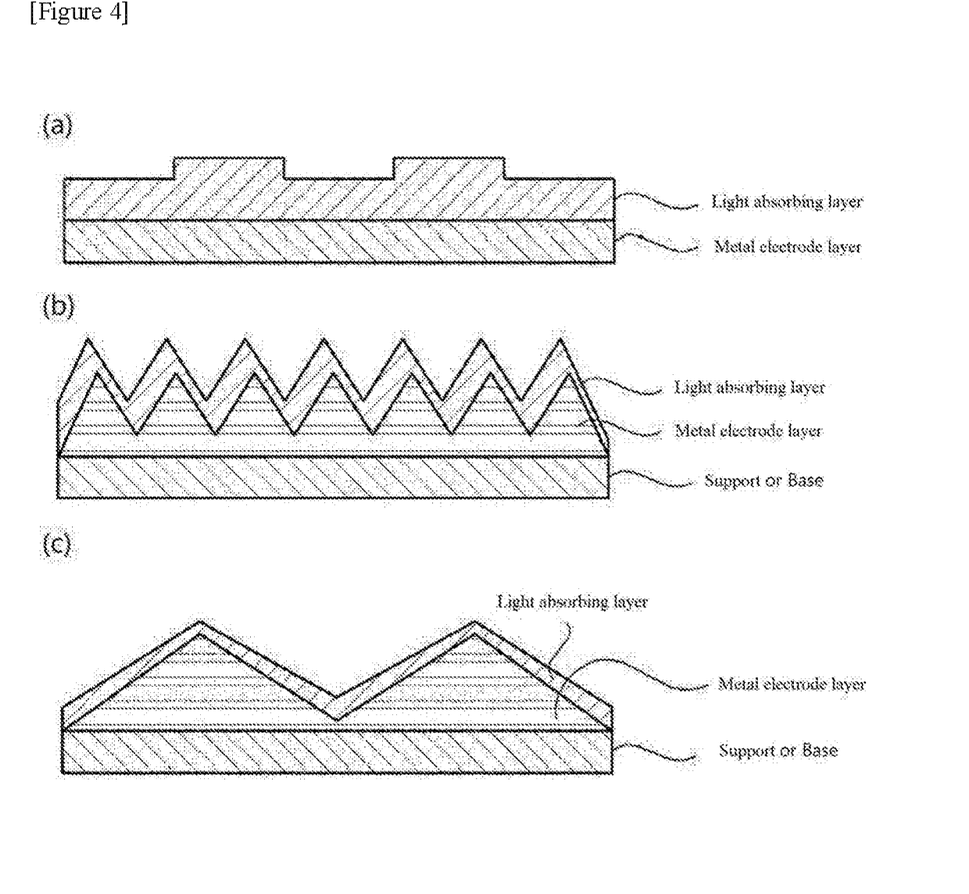
FIG. 4 shows a cross-section of a reflective base material according to another example of the present application.

In another example, the light absorbing layer may have curvature or unevenness as in FIG. 4. The cross-sectional shape of the curvature or unevenness is not particularly limited, which may be, for example, a part of a circle, or a part of a triangle or a quadrilateral. When the curvature or unevenness is repeated, interference of various paths may occur, so that the reflective base material can impart various color patterns to the electrochromic film.

In another example, one side of the light absorbing layer may have a regular or irregular pattern. The form of the pattern is not particularly limited. By the regular or irregular pattern, interference of various paths can occur in the reflective base material, and accordingly, the reflective base material can impart various color patterns to the electrochromic film.

In one example, the light absorbing layer may have a refractive index in a range of 0 to 3.

In one example, the light absorbing layer may have an extinction coefficient value k in a range of 0.2 to 2.5. More specifically, the light absorbing layer may have an extinction coefficient in the range of 0.2 to 1.5 or 0.2 to 0.8. The extinction coefficient k is also called an absorption coefficient, which is a measure for determining how much a structure can absorb light or a ray at a particular wavelength. For example, when k is less than 0.2, it is transparent, so that the degree of light absorption is insignificant. On the contrary, when the metal component content of the light absorbing layer is increased, the reflection characteristic becomes dominant, and the value of k becomes more than 2.5. In the case of having the extinction coefficient in the above range, the light absorbing layer can efficiently perform the intended interference effect in the present application.

The method of providing the light absorbing layer is not particularly limited. For example, the light absorbing layer can be formed using a known wet or dry method. More specifically, the light absorbing layer can be formed using sputtering, CVD (chemical vapor deposition), or an electron beam (e-beam).

In one example, the reflective base material may have sheet resistance of $100\Omega/\square$ or less. More specifically, the lower limit may be $1\Omega/\square$ or more or $3\Omega/\square$ and the upper limit may be $70\Omega/\square$ or $50\Omega/\square$. The sheet resistance in the above range is a value lower than the sheet resistance that a transparent conductive oxide represented by ITO generally has, for example, a level of $150\Omega/\square$. When it has the sheet resistance in the above range, the electrochromic rate of the film can be improved. The sheet resistance can be measured by a known sheet resistance meter.

The electrochromic layer may comprise a electrochromic material that an optical characteristic, that is, a color change through a reversible oxidation-reduction reaction. The kind of the electrochromic material is not particularly limited.

In one example, the electrochromic layer may comprise a reducing electrochromic material that is colored when a reduction reaction occurs. The type of the reducing electrochromic material is not particularly limited, but for example, the reducing electrochromic material may be an oxide of Ti, Nb, Mo, Ta or W such as $WO_3$, $MoO_3$, $Nb_2O_5$, $Ta_2O_5$ or $TiO_2$.

In another example, the electrochromic layer may comprise a material having a different coloring property from the reducing electrochromic material, that is, an oxidizing electrochromic material. The type of the oxidizing electrochromic material is also not particularly limited, but for example, the oxidizing electrochromic material may be a material selected from an oxide of Cr, Mn, Fe, Co, Ni, Rh or Ir, such as LiNiOx, $IrO_2$, NiO, $V_2O_5$, $LixCoO_2$, $Rh_2O_3$ or $CrO_3$; a hydroxide of Cr, Mn, Fe, Co, Ni, Rh or Ir; and prussian blue.

The electrochromic layer may be provided using a known method, for example, various types of wet or dry coating methods.

Without being particularly limited, the electrochromic layer may have a thickness in a range of 30 nm to 500 nm.

In one example, the electrochromic film may comprise a metal electrode layer, a light absorbing layer and an electrochromic layer sequentially. Such a configuration can improve visibility of the alteration, adjustment or change of the inherent color of the electrochromic layer by the light absorbing layer. The layer structure may also constitute an electrochromic film while directly contacting with each other or a separate configuration may also exist between the respective layers.

In one example, the electrochromic film may comprise two or more light absorbing layers. For example, when the electrochromic film comprises two light absorbing layers, the electrochromic film may comprise a second light absorbing layer, a metal electrode layer, a first light absorbing layer and an electrochromic layer sequentially. The layer structure may also constitute an electrochromic film while directly contacting with each other or a separate configuration may also be included between the respective layers.

In one example, the electrochromic film of the present application may further comprise a passivation layer. As described above, for realizing a reflective electrochromic film and improving a color-switching speed of the electrochromic film, the present application comprises a metal in the electrode layer. In addition, a metal-containing light absorbing layer is included in order to impart an improved esthetic sense or color sense to the film. However, side reactions may occur between the electrolyte ions involved in the electrochromism of the electrochromic layer and the metal components contained in the layer, and accordingly, the respective layers may be deteriorated. For example, when the metal electrode layer is deteriorated, the above-mentioned objects of the present application cannot be achieved, as well as the durability of the device is lowered. Thus, the present application may comprise a passivation layer that prevents deterioration of the metal layer. The passivation layer performs a kind of barrier function for preventing the electrode layer including the metal component and the light absorbing layer from being deteriorated by the electrolyte ions.

In one example, the passivation layer may comprise a transparent conductive oxide. More specifically, a transparent conductive oxide, such as ITO (indium tin oxide), $In_2O_3$ (indium oxide), IGO (indium gallium oxide), FTO (fluorodo doped tin oxide), AZO (aluminum doped zinc oxide), GZO (gallium doped zinc oxide), ATO (antimony doped tin oxide), IZO (indium doped zinc oxide), NTO (niobium doped titanium oxide) or ZnO (zinc oxide), can be used for the passivation layer.

In one example, the electrochromic film may comprise a passivation layer between the electrochromic layer and the light absorbing layer. In addition, when two or more light absorbing layers are included, it may comprise a passivation layer between the electrochromic layer and the first light absorbing layer or between the electrochromic layer and the second light absorbing layer.

The electrochromic film of the present application may further comprise an electrolyte layer and a counter electrode layer. The electrolyte layer and the counter electrode layer may be sequentially positioned on the opposite surface of one side of the electrochromic layer facing the light absorbing layer. For example, the electrochromic film of the present application may comprise a metal electrode layer, a light absorbing layer, an electrochromic layer, an electrolyte layer and a counter electrode layer sequentially.

The electrolyte layer is a structure for providing electrolyte ions involved in the electrochromic reaction to the electrochromic layer. The type of the electrolyte is not particularly limited. For example, a liquid electrolyte, a gel polymer electrolyte or an inorganic solid electrolyte may be used without limitation.

The specific composition of the electrolyte used in the electrolyte layer is not particularly limited as long as it can provide electrolyte ions involved in electrochromic of the electrochromic layer or an ion storage layer to be described below. In one example, the electrolyte layer may comprise a metal salt capable of providing electrolyte ions such as $H^+$, $Li^+$, $Na^+$, $K^+$, $Rb^+$ or $Cs^+$. More specifically, the electrolyte layer may comprise a lithium salt compound such as $LiClO_4$, $LiBF_4$, $LiAsF_6$ or $LiPF_6$, or a sodium salt compound such as $NaClO_4$.

In one example, the electrolyte layer may further comprise a carbonate compound as a solvent. Since the carbonate-based compound has a high dielectric constant, ion conductivity can be increased. As a non-limiting example, a solvent, such as PC (propylene carbonate), EC (ethylene carbonate), DMC (dimethyl carbonate), DEC (diethyl carbonate) or EMC (ethylmethyl carbonate), may be used as the carbonate-based compound.

Unlike the above-mentioned metal electrode layer, the counter electrode layer may be a light-transmitting electrode layer having excellent light transmittance. In the present application, the "light transmission characteristic" may mean, for example, a case where the transmittance to visible light is 60% or more, specifically 60% to 95%. At this time, the visible light may mean light in a wavelength range of 380 nm to 780 nm, specifically, light having a wavelength of about 550 nm. The transmittance can be measured using a known method or apparatus, for example, a haze meter or the like. The transmittance can be equally applied to the electrolyte layer.

The kind of the material usable for the counter electrode is not particularly limited as long as it has a light transmission characteristic. For example, a transparent conductive oxide having a light transmission characteristic, or a metal mesh or an OMO (oxide/metal/oxide) may be used as the counter electrode. At this time, since the OMO can provide lower sheet resistance than the transparent conductive oxide typified by ITO, it can contribute to improvement of the electrochromic speed of the element.

As the transparent conductive oxide usable for the counter electrode layer, the same oxide as the transparent conductive oxide mentioned above as the passivation layer material can be used.

The metal mesh usable for the counter electrode layer may have a lattice form including Ag, Cu, Al, Mg, Au, Pt, W, Mo, Ti, Ni or an alloy thereof. However, the material usable for the metal mesh is not limited to the above-listed metal materials.

The OMO usable for the counter electrode layer may comprise an upper layer, a lower layer and a metal layer therebetween. In one example, the upper and lower layers may comprise an oxide of one or more metals selected from the group consisting of Sb, Ba, Ga, Ge, Hf, In, La, Se, Si, Ta, Se, Ti, V, Y, Zn and Zr. In addition, the metal layer of the OMO may comprise a metal such as Ag, Cu, Zn, Au or Pd.

Without being particularly limited, the counter electrode layer may have a thickness of 50 nm to 400 nm or less.

In one example, the electrochromic film of the present application may further comprise an ion storage layer between the electrolyte layer and the counter electrode layer. The ion storage layer may mean a layer formed to match charge balance with the electrochromic layer upon oxidation and reduction reactions for electrochromism.

The ion storage layer may comprise an electrochromic material having a coloring property different from that of the electrochromic material used in the electrochromic layer. For example, when the electrochromic layer comprises a reducing electrochromic material, the ion storage layer may comprise an oxidizing electrochromic material. Also, the opposite is possible.

In one example, the electrochromic film may further comprise a light-transmitting base material on a lateral surface of the film. For example, the light-transmitting base material may be located on the lateral surface of the metal electrode layer and/or the counter electrode layer.

In one example, the type of the light-transmitting base material is not particularly limited, but for example, glass or a polymer resin may be used. More specifically, a polyester film such as PC (polycarbonate), PEN (poly(ethylene naphthalate)) or PET (poly(ethylene terephthalate)), an acrylic film such as PMMA (poly(methyl methacrylate)), or a polyolefin film such as PE (polyethylene) or PP (polypropylene), and the like can be used as a light-transmitting base material. The light-transmitting base material may have the same transmittance as that of the counter electrode layer as described above.

In another example, the electrochromic film may further comprise a power source. The manner of electrically connecting the power source to the device is not particularly limited, which may be suitably performed by those skilled in the art.

In one example of the present application, the present application relates to an element, device or instrument comprising the film. The type of the device is not particularly limited, but may be, for example, a shell of a computer or a mobile phone, a wearable appliance such as a smart watch or smart clothing, or a construction material such as a window. In one example, the film can be used as a decorative film in these elements, devices or instruments.

Advantageous Effects

According to one example of the present application, an electrochromic film that can improve the electrochromic speed and realize various esthetic senses, color senses or stereoscopic color patterns, and an element, a device or an instrument comprising the same can be provided.

BEST MODE

Hereinafter, the present application will be described in detail through Examples. However, the scope of protection of the present application is not limited by Examples to be described below.

Experimental Example 1: Confirmation of Color Change by Reflective Base Material Production Example 1

Figure 5:
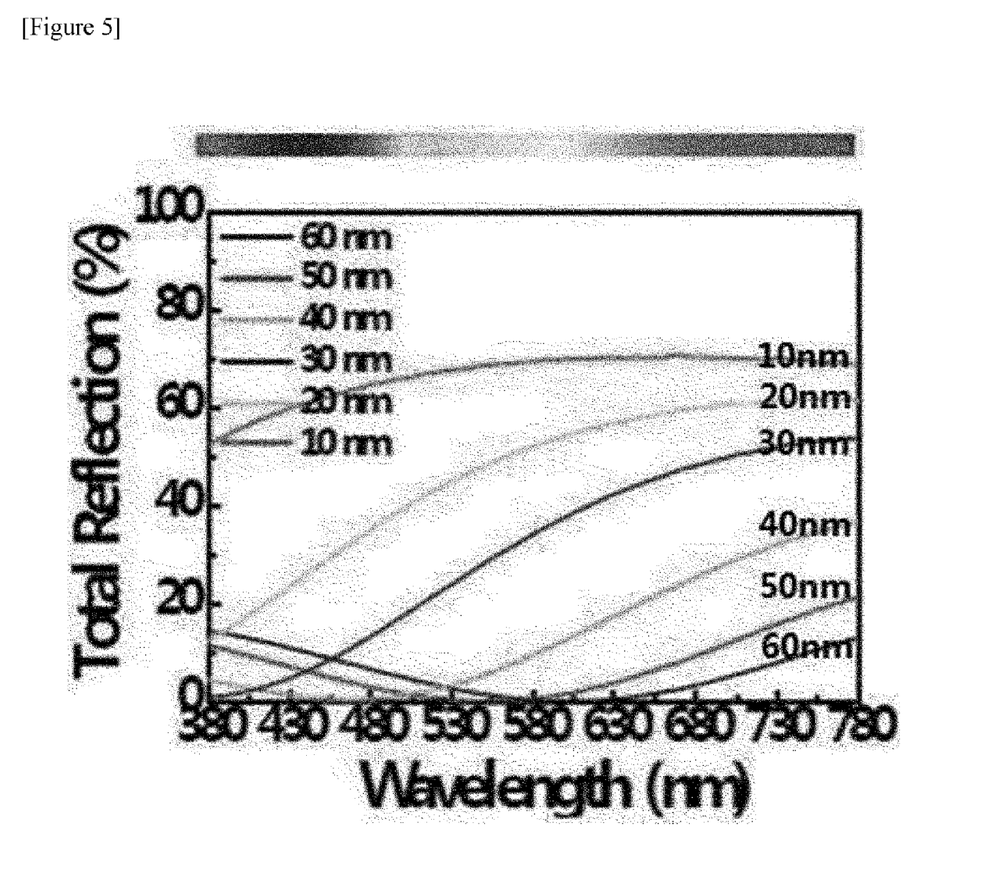
FIG. 5 shows the total reflectance for each wavelength, which appears when a thickness of a light absorbing layer changes, according to one example of the present application.

Using sputtering deposition, a reflective base material was produced, in which an $AlO_xN_y$ layer satisfying the above-described Relation Equation and Equations and having a thickness of 10 nm, an Al layer having a thickness of 100 nm and a transparent PET were sequentially laminated. The reflectance that the base material has for each wavelength is the same as in FIG. 5, and the color of the base material to be viewed is as shown in Table 1.

Production Examples 2 to 6

A reflective base material was produced in the same manner, except that the thickness of the $AlO_xN_y$ layer was changed as in Table 1 below. The reflectance that the base material has for each wavelength is the same as in FIG. 5, and the color of the base material to be viewed is as shown in Table 1.

TABLE 1

| | AlOxNy Layer | | | |
|---|---|---|---|---|
| | Elemental Content (atomic %) | Relation Equation Value | Thickness (nm) | Color |
| Production Example 1 | Al: 57.9 | 1.4 | 10 | Light grey |
| Production Example 2 | O: 4.3 | | 20 | Grey |
| Production Example 3 | N: 37.8 | | 30 | Light brown |
| Production Example 4 | | | 40 | Gold |
| Production Example 5 | | | 50 | Violet |
| Production Example 6 | | | 60 | Blue |

Experimental Example 2: Confirmation of Electrochromic Speed Improvement

The values related to the experiment were measured using the following method or apparatus.

Resistance: The sheet resistance was measured for the reflective base materials of Examples and the ITO of Comparative Example corresponding to the reflective base materials of the above examples, using a known sheet resistance meter according to a 4-point probe method.

Figure 6:
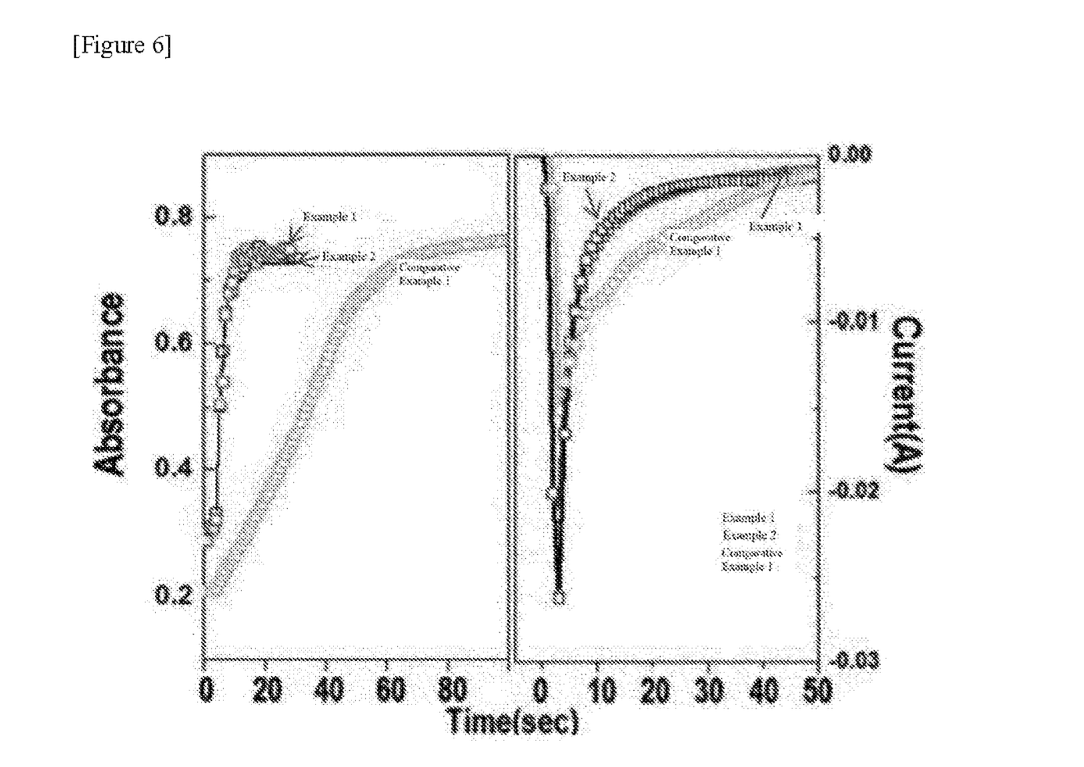
FIG. 6 is a graph showing a comparison of element characteristics of Examples and Comparative Examples.

Absorbance: measured and recorded using the following equation (see FIG. 6).

Absorbance $(A)=\log(I_0/I)=\log 1/T=\log 100/\% \ T=2-\log T$ (wherein, Absorbance=−Log Transmittance, Transmittance $T=I/I_0$, % $T=100×T$, $I_0$=intensity of the light entering the sample, I=intensity of the light leaving the sample)

Color Change Time: The time taken to reach the 80% level of the finally colored state transmittance observed after elapse of the time (50 s) for applying the potential for coloring was measured. Furthermore, the time taken to reach the 80% level of the finally bleached state transmittance observed after elapse of the time (50 s) for applying the potential for bleaching was measured.

Example 1

The reflective base material of Production Example 3, an ITO layer having a thickness of 80 nm and a $WO_3$ layer having a thickness of 250 nm were sequentially laminated. An electrolytic solution ($LiClO_4$ (1M)+propylene carbonate (PC)) and a potentiostat device were prepared and a voltage of −1V was applied for 50 seconds to color $WO_3$.

The film was bonded to a Prussian blue (PB)/ITO laminate together via a gel polymer electrolyte (GPE) to produce a film having a laminated structure of $Al/AlO_xN_y/ITO/WO_3/GPE/PB/ITO$ The electrochromic speed was measured while repeatedly applying a bleaching voltage and a coloring voltage to the produced film at a constant cycle. The bleaching voltage and the coloring voltage per one cycle were applied for 50 seconds at a magnitude of (±) 1.2V, respectively. After driving a predetermined cycle for stabilization, the measured results are as shown in Table 2 and FIG. 6.

Example 2

An electrochromic film was produced in the same manner as in Example 1, except that the thickness of the Al layer was changed to 50 nm. The measurement points of the related physical properties are the same as those of Example 1.

Comparative Example 1

An ITO layer having a thickness of 210 nm and a $WO_3$ layer having a thickness of 250 nm were sequentially laminated on a PET base material without using the reflective base material of Example 1. Thereafter, a transmissive electrochromic film ($ITO/WO_3/GPE/PB/ITO$) was produced through the same process. The measurement points of the related physical properties are the same as those of Example 1.

TABLE 2

| | Resistance (Ω/□) | Coloring Time | Bleaching Time |
|---|---|---|---|
| Example 1 | 4 | 7 | 6 |
| Example 2 | 8 | 7 | 7 |
| Comparative Example 1 | 150 | 30 | 32 |

From Table 2 and FIG. 6, it can be confirmed that since the reflective base materials of Examples of the present application have a very low level of resistance, they contribute to improvement in the coloring time and bleaching time.

The invention claimed is:
1. An electrochromic film, comprising:
a reflective base material; and
an electrochromic layer,
wherein the reflective base material comprises a metal electrode layer and a light absorbing layer,
wherein the electrochromic film comprises the metal electrode layer, the light absorbing layer, and the electrochromic layer sequentially, and wherein the light absorbing layer comprises a nitride or an oxynitride comprising one or more metal selected from the group consisting of molybdenum (Mo), titanium (Ti), aluminum (Al) and copper (Cu).

2. The electrochromic film according to claim 1, wherein the metal electrode layer comprises one or more selected from the group consisting of aluminum (Al), gold (Au), silver (Ag), platinum (Pt), palladium (Pd), titanium (Ti), nickel (Ni), tungsten (W), copper (Cu) and an alloy thereof.

3. The electrochromic film according to claim 1, wherein the metal electrode layer has a thickness in a range of 10 nm to 500 nm.

4. The electrochromic film according to claim 1, wherein the light absorbing layer comprises $CuO_xN_y$ (0≤x≤1, 0≤y≤1, x+y>0); $MoTi_aO_xN_y$ (0<a≤2, 0≤x≤3, 0≤y≤2, x+y>0); or $AlO_xN_y$ (0≤x≤1.5, 0≤y≤1, x+y>0) satisfying Relation Equation:

$$1 < \frac{(\text{aluminum elemental content}) \times 3}{(\text{oxygen elemental content}) \times 2 + (\text{nitrogen elemental content}) \times 3} < 2 \quad \text{[Relation Equation]}$$

wherein, in $AlO_xN_y$, x and y mean ratios of atomic numbers of O and N to one atom of Al, respectively and in Relation Equation, based on 100% of all elemental contents contained in $AlO_xN_y$, the (aluminum elemental content) represents the elemental content (atomic %) of Al, the (oxygen elemental content) represents the elemental content (atomic %) of O, and the (nitrogen elemental content) represents the elemental content (atomic %) of N.

5. The electrochromic film according to claim 1, wherein the light absorbing layer has a thickness in a range of 5 nm to 500 nm.

6. The electrochromic film according to claim 5, wherein the light absorbing layer has a thickness gradient.

7. The electrochromic film according to claim 5, wherein the light absorbing layer has an unevenness.

8. The electrochromic film according to claim 5, wherein the light absorbing layer has a pattern.

9. The electrochromic film according to claim 1, wherein the light absorbing layer has an extinction coefficient of 0.2 to 2.5.

10. The electrochromic film according to claim 1, wherein the reflective base material has sheet resistance of 100Ω☐ or less.

11. The electrochromic film according to claim 1, wherein the electrochromic layer has a thickness in a range of 30 nm to 500 nm.

12. The electrochromic film according to claim 11, wherein the electrochromic layer comprises a reducing electrochromic material or an oxidizing electrochromic material.

13. The electrochromic film according to claim 12, wherein the reducing electrochromic material, when present, comprises an oxide selected from Ti, Nb, Mo, Ta or W, and
the oxidizing electrochromic material, when present, comprises one or more selected from the group consisting of (a) an oxide selected from Cr, Mn, Fe, Co, Ni, Rh or Ir; (b) a hydroxide selected from Cr, Mn, Fe, Co, Ni, Rh or Ir; and (c) prussian blue.

14. The electrochromic film according to claim 1, wherein the metal electrode layer, the light absorbing layer and the electrochromic layer are present sequentially.

15. The electrochromic film according to claim 14, further comprising a passivation layer between the electrochromic layer and the light absorbing layer, wherein the passivation layer comprises a transparent conductive oxide.

16. The electrochromic film according to claim 1, wherein the the reflective base material comprises the metal electrode layer and a first and second light absorbing layer, wherein
the second light absorbing layer, the metal electrode layer, the first light absorbing layer and the electrochromic layer are present sequentially.

17. The electrochromic film according to claim 16, further comprising a passivation layer either (a) between the electrochromic layer and the first light absorbing layer or (b) between the electrochromic layer and the second light absorbing layer, wherein the passivation layer comprises a transparent conductive oxide.

18. A device comprising the electrochromic film according to claim 1.

* * * * *